United States Patent [19]
Solbrig et al.

[11] 3,865,070
[45] Feb. 11, 1975

[54] DEVICE AND METHOD FOR CONVERTING HEAT FROM FUEL INTO VISIBLE LIGHT WITH CHANGEABLE COLORS

[75] Inventors: Charles W. Solbrig, Idaho Falls, Idaho; Sanford A. Weil, Chicago; Robert B. Rosenberg, Evergreen Park, both of Ill.

[73] Assignee: American Gas Association, Inc., Arlington, Va.

[22] Filed: Oct. 19, 1970

[21] Appl. No.: 81,999

[52] U.S. Cl. ............................ 116/63 R, 116/114 R
[51] Int. Cl. ............................................. G08g 1/095
[58] Field of Search ....... 116/63, 114; 126/92, 39 J; 73/356; 161/1; 431/328, 329; 252/492; 106/47, 55; 313/53, 112; 350/160 P

[56] References Cited
UNITED STATES PATENTS

| | | | |
|---|---|---|---|
| 996,182 | 6/1911 | Wiederhold | 252/492 |
| 1,558,153 | 10/1925 | Ferkel | 73/356 |
| 1,993,778 | 3/1935 | Francis, Jr. | 252/492 |
| 3,252,374 | 5/1966 | Stookey | 350/160 |
| 3,299,938 | 1/1967 | Bally et al. | 126/92 R X |
| 3,419,370 | 12/1968 | Cramer et al. | 161/1 |

Primary Examiner—Jerry W. Myracle
Assistant Examiner—Denis E. Corr
Attorney, Agent, or Firm—Molinare, Allegretti, Newitt & Witcoff

[57] ABSTRACT

An apparatus and method for converting heat from the combustion of fuel into visible and colored light by providing a plurality of radiators which are thermally excitable to emit visible lights, positioning the radiators in parallel in-line relationship so that the light emitted by the initial radiator passes through and is modified by subsequent radiators, and means for controllably heating each of said radiators to predetermined temperature levels by the combustion of fuel.

8 Claims, 1 Drawing Figure

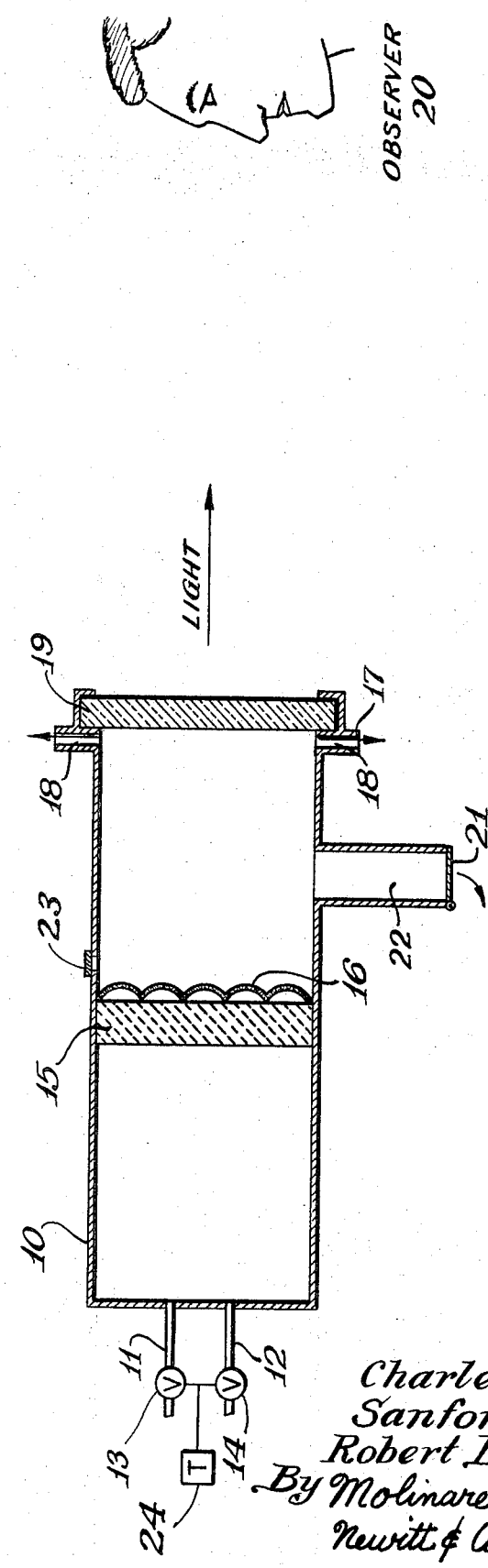

DEVICE AND METHOD FOR CONVERTING HEAT FROM FUEL INTO VISIBLE LIGHT WITH CHANGEABLE COLORS

BACKGROUND OF THE INVENTION

This invention relates to a device and method for converting heat from fuel into visible light. More particularly, the invention relates to a method and device for converting heat from fuel into visible light having predetermined and variable colors.

There are many situations where it is desired to have lights with different colors. Frequently, it is desired to have these lights change their colors through a predetermined cycle. The most common examples are the traffic lights and advertising devices. The prior art devices used to obtain such colored lights are generally of the electric type. Thus, for example, the common traffic light is powered by electricity and it can be divided into three principal parts: The parts for generating red, amber and green lights. Each of these parts is a complete unit in itself, containing a mechanism for converting electrical energy into visible light and a filter for filtering or modifying the light so generated.

There is no single solid real substance having a surface which can be thermally excited to generate a variety of colors, intense enough to be seen in a lighted room, other than the colors within the range of ±0.1 of the blackbody curve on a tristimulus diagram (essentially red to orange to white).

The electric stop lights and other colored lights generating devices are inefficient in that they require a separate device for generating each particular colored light and usually they can only generate a colored light by the use of a filter or prism. The use of a filter or prism is inefficient in that only a small fraction of the white light generated is allowed to pass through the filter to give the colored visual effect. For example, when a one candle-power green light is desired, it may be necessary to generate a white light having many candle-powers.

It is accordingly, an object of the present invention to provide a novel device for generating visible light.

It is another object of the invention to provide a device for converting heat from fuel into visible colored lights.

It is a further object of the invention to provide a device and method for converting heat to a predetermined cycle of visible colored lights.

Further objects of the invention can be gathered from a reading of the following disclosure.

SUMMARY OF THE INVENTION:

In accordance with the present invention, we provide a device having a plurality of parallel in-line radiators which when heated emit visible radiation. Means are provided within the device for heating the radiators by the combustion of fuel to predetermined temperature levels. The radiators are positioned in a parallel, in-line relationship within the device so that the radiation emitted by the first radiator must pass through the remaining radiators before leaving the device. The remaining radiators are selected and constructed from materials so that they can act as filtering, absorbing and/or re-radiating elements. In this manner, the remaining radiators not only are capable of emitting their own radiations, but they could at the same time modify the radiation coming from the first and other preceding radiators.

A surprising result of the present invention resides in the fact that the color locus of the light emitted by the device, which is obtained by varying the temperatures of the individual radiators, is not a straight line on a tristimulus diagram. Normally, when two colored lights are mixed, the color locus is a straight line on a tristimulus diagram. Thus, the present invention provides a relatively simple means for generating visible colored lights according to a predetermined color cycle and having a color locus not possible with any single device known in the prior art. A given color cycle can be generated according to the present invention by the proper selection of the radiators and the temperatures to which the radiators are to be heated.

A second surprising result of the multiple radiator system for color generation is that the light intensity of the second radiator increases to a greater level when its temperature is increased than would be produced by the radiators individually. When the second radiator is at a relatively low temperature, it acts as a filter and the output intensity is less than that produced by the first radiator. As the temperature of the second radiator increases, it begins to emit radiation. At a given appropriate temperature, the combination produces more radiation than either radiator alone. At high temperatures, the system acts as if the second radiator were present alone.

BRIEF DESCRIPTION OF THE DRAWING AND OF THE PREFERRED EMBODIMENTS

The invention will now be described with particular reference to the drawing which shows a device of the invention suitable for use as a traffic light.

In the drawing, a device is shown having a metal housing 10. At the inlet end of housing 10, there are located conduits 11 and 12 for passing fuel and air, respectively, into the housing. The amounts of fuel and air admitted into the housing are regulated by control means 13 and 14, respectively. Located within the housing 10 and in the path of the fuel and air mixture is a porous fire brick support 15. Porous fire brick support 15 permits the passage of the fuel and air mixture therethrough. On the downstream side of the fire brick support 15, there is fastened to the support a ceria-thoria mantle fabric 16. Combustion products 17 leave the housing by way of exit 18. A green glass filter 19 is positioned over exit 18 but not completely blocking the escape of the combustion products. Combustion products could also flow through material 19 depending on its form.

When in operation, a fuel, such as natural gas, and air are admitted to the housing and passed through the porous fire brick support and ignited on the downstream side of the fire brick support, for example by way of access means 23. The heat of combustion raises the temperature of the ceria-thoria mantle fabric, which has a very low heat capacity, almost instantaneously to a temperature of about 3,000°R. At this temperature, the ceria-thoria mantle fabric emits a white light which passes through the green glass filter 19 and is seen by an observer 20 as a green light. The components of the white light other than green are absorbed by the glass filter. The combustion products 17 come into contact with the green glass filter 19 before leaving the device and heat is transferred to the green glass filter thereby.

When the green glass filter 19 is heated to a temperature of about 2,000°–2,500°R, it emits sufficient visible light which when combined with the filtered light originating from the ceria-thoria mantle fabric causes the observer to see a yellow light. The yellow light is the result of mixing two lights: the light from the mantle fabric filtered and passed through the green glass filter; and the light emitted by the green glass filter itself. Upon further heating of the green glass filter, its temperature reaches about 3,000°R and the observer now sees a red light. After the device has emitted the red light for the predetermined amount of time, the green glass filter 19 is then allowed to cool to a temperature below 2,000°R, say, 1,000°R. This cooling can be effected by, for example, discontinuing the supply of the fuel and air mixture (or the supply of fuel) to the device, or by opening a valve 21 in a large by-pass conduit 22 on the housing located between the mantle fabric and the exit 18. If the supply of fuel and air mixture to the device is to be discontinued, a suitable conventional timing device 24 should be used in association with the control means 13 and 14 so that the supply of fuel and air would be automatically reestablished to start the green portion of the color cycle again.

EXAMPLE 1

An apparatus substantially as shown in the drawing was employed to generate colored lights. The color cycle of a traffic light was simulated by the use of a green glass filter as the second radiator, using a 2 mm thick red-free green glass, commercially available from Bausch & Lomb Optical Co. The fuel employed was a natural gas and air mixture in a ratio of 1:10. Within 2 seconds of initial combustion, the ceria-thoria mantle fabric was at a temperature of about 3,000°R and giving off a white light. This white light was filtered through the green glass filter and a green light was visible from the outside of the device. This green light portion of the color cycle was maintained for about 30 seconds, during which time the exhaust gases heat the green filter glass to a temperature between 1,500°–2,000°R. It was observed that even at this relatively low temperature, the green filter was beginning to emit its own radiation and modifying the color of the light visible to an observer. At this time, the amount of fuel air mixture supplied to the device was substantially increased to rapidly heat the green filter glass to about 2,500°R. After this temperature was achieved, the visible light emitted by the device was of a yellow color. Upon continued and increased heating of the filter glass, its temperature finally reached 3,000°R, at which time the visible light from the outside of the device became red in color. After about 30 seconds at the red color, the green filter glass was rapidly cooled down to about 1,000°–1,500°R by discontinuing the supply of fuel to the device. When the device was permitted to thus cool down, it took somewhat less than 10 seconds. However, a much quicker cooling effect was obtained when a small amount of air, without any fuel therein, was blown through the device during the cooling period. After the green filter glass was sufficiently cool, the supply of the fuel-air mixture was again commenced and combustion re-established. In this manner, the green light portion of the color cycle was started. The entire cycle of green to yellow to red and back to green again took about 1.5 minutes.

EXAMPLE 2

The apparatus as in Example 1 was modified to employ a 5 mm thick blue glass filter, commercially available as Corning Glass Works CG-506, as the second radiator in front of the ceria-thoria mantle. The operation was as in Example 1 with the mantle giving off white light. From the exterior of the device the color appeared blue. Upon increase in filter color as in Example 1 from 1,500°–2,000°R, the color locus changed from the initial blue to purple-pink at around 2,500°R, to red at 3,000°R. Upon cooling, the cycle could be reversed and repeated.

It will be appreciated that other radiating materials can be used instead of the ceria-thoria mantle fabric and the green glass filter. However, the mantle fabric is a preferred material for use as the first radiator because of its low heat capacity. The low heat capacity of mantle fabric permits it to be heated and cooled almost instantaneously to the desired temperature.

Almost any desired color can be produced by the device of the invention through the proper selection of temperatures and the combination of primary and/or secondary radiators. When more than two radiators are used, the range of colors obtainable is considerably widened, and the design, control and operation of such a device is analogous to the two-radiator devices described above.

The invention has been described in detail with reference to particular and preferred embodiments thereof, but it will be understood that variations and modifications can be made within the spirit and scope of the invention as described hereinabove and as defined in the appended claims.

We claim:

1. An apparatus for converting heat from the combustion of fuel into visible lights having predetermined and controllable colors comprising: an opaque housing having an opening at one end thereof for passage of light out of said housing, a plurality of radiators thermally excitable to emit visible colored lights disposed in said housing, said plurality of radiators including a first radiator comprising a ceria-thoria mantle and a second radiator comprising a colored transparent or translucent filter capable of withstanding high temperatures positioned in optically coupled relationship to said first radiator so that light emitted by said first radiator passes through said second radiator before emerging from the opening in said housing, and means for heating each of said radiators to predetermined temperature levels to produce colored lights visible at said opening, said heating means including natural gas inlet means and means for igniting said natural gas, and means for regulating the flow of natural gas into said apparatus.

2. An apparatus as in claim 1 wherein said second radiator is a green glass filter.

3. An apparatus as in claim 1 wherein said second radiator is a blue glass filter.

4. A process for obtaining controllable colored lights which comprises a. heating a first, ceria thoria mantle fabric radiator to a predetermined temperature by combustion of natural gas to emit visible light;

b. heating a colored transparent or translucent filter capable of withstanding high temperatures and defining a second radiator to a predetermined temperature to emit visible light; and c. passing the light from the first mantle fabric radiator through the second radiator to obtain a predetermined resultant colored light; and d. selecting the resultant light color by controlling the temperature of said second radiator.

5. The process of claim 4 including passing the light from said first mantle fabric radiator through a green glass filter.

6. The process of claim 5 wherein the temperature of said green glass filter is selectively controlled to obtain red, yellow and green colored lights.

7. The process of claim 4 including passing the light from said first mantle fabric radiator through a blue glass filter.

8. The process of claim 4 including the step of burning natural gas to heat said first and second radiators to said predetermined temperatures.

* * * * *